US012718263B2

(12) United States Patent
Ikezawa et al.

(10) Patent No.: US 12,718,263 B2
(45) Date of Patent: Aug. 25, 2026

(54) INFORMATION PROCESSING SYSTEM, BENEFIT-GRANTING METHOD, AND RECORDING MEDIUM

(71) Applicant: NEC Corporation, Tokyo (JP)

(72) Inventors: Rumi Ikezawa, Tokyo (JP); Tadamasa Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/728,891

(22) PCT Filed: Jan. 28, 2022

(86) PCT No.: PCT/JP2022/003282

§ 371 (c)(1),
(2) Date: Jul. 15, 2024

(87) PCT Pub. No.: WO2023/144990

PCT Pub. Date: Aug. 3, 2023

(65) Prior Publication Data

US 2025/0111404 A1 Apr. 3, 2025

(51) Int. Cl.
*G06Q 30/0238* (2023.01)
*G06Q 20/20* (2012.01)
(Continued)

(52) U.S. Cl.
CPC ....... *G06Q 30/0238* (2013.01); *G06Q 20/208* (2013.01); *G06V 20/50* (2022.01); *G06V 40/10* (2022.01)

(58) Field of Classification Search
None
See application file for complete search history.

(56) References Cited

U.S. PATENT DOCUMENTS 10,460,464 B1 * 10/2019 Hasan ........................ G06T 7/62
2011/0248083 A1 * 10/2011 Bonner .................. G06V 20/52
235/375
(Continued)

FOREIGN PATENT DOCUMENTS

JP 2002-207805 A 7/2002
JP 2004-157634 A 6/2004
(Continued)

OTHER PUBLICATIONS

International Search Report for PCT Application No. PCT/JP2022/003282, mailed on Mar. 22, 2022.
(Continued)

*Primary Examiner* — Allan J Woodworth, II
(74) *Attorney, Agent, or Firm* — Sughrue Mion, PLLC

(57) ABSTRACT

An information processing system according to an aspect of the present disclosure includes: at least one memory configured to store instructions; and at least one processor configured to execute the instructions to: register a product whose identification information is input by a customer's operation on a portable terminal; accept necessity of a disposable shopping bag from the portable terminal; determine a benefit in response to registration of one or more products in a case where a fact that a disposable shopping bag is unnecessary is accepted; and grant the determined benefit in a case where payment for the registered product is made.

14 Claims, 12 Drawing Sheets

(51) Int. Cl.
*G06V 20/50* (2022.01)
*G06V 40/10* (2022.01)

(56) References Cited

U.S. PATENT DOCUMENTS

| | | | | |
|---|---|---|---|---|
| 2016/0110957 | A1* | 4/2016 | Vaysman | G06Q 30/0275 463/16 |
| 2018/0004779 | A1* | 1/2018 | Moore | B65B 59/003 |
| 2020/0342487 | A1* | 10/2020 | Greenberger | G06Q 30/0233 |
| 2021/0056636 | A1* | 2/2021 | Scavo | G06Q 30/0217 |
| 2021/0061564 | A1* | 3/2021 | Ibe | G07F 11/26 |
| 2021/0081909 | A1* | 3/2021 | Wittek | G06K 7/10297 |

FOREIGN PATENT DOCUMENTS

| | | | |
|---|---|---|---|
| JP | 2007-102527 | A | 4/2007 |
| JP | 2008-171259 | A | 7/2008 |
| JP | 2019-153074 | A | 9/2019 |
| JP | 2019-185692 | A | 10/2019 |
| JP | 2020-177313 | A | 10/2020 |
| JP | 2020-194234 | A | 12/2020 |
| JP | 2021-092956 | A | 6/2021 |

OTHER PUBLICATIONS

English translation of Written opinion for PCT Application No. PCT/JP2022/003282, mailed on Mar. 22, 2022.

* cited by examiner 1
30
REGISTERED PRODUCT LIST DATABASE
31
POS SERVER
32
PRODUCT DATABASE
33
SALES DATABASE
100
101
REGISTRATION UNIT
102
ACCEPTING UNIT
103
DETERMINATION UNIT
104
GRANTING UNIT
105
DISPLAY CONTROL UNIT
20

Fig.7
D1
2:35 PM
100%
MR./MRS./MS.
SHOPPING BASKET
P 492
XXXX STORE
(INCLUDING TAX)
3 ITEMS
678 YEN
PRODUCT NAME
QUANTITY
AMOUNT OF MONEY
ZOO BISCUIT
× DELETE
1
UNIT PRICE 252 YEN
252 YEN
DELICIOUS MILK
× DELETE
2
UNIT PRICE 218 YEN
436 YEN
DISCOUNT FOR BRINGING YOUR OWN BAG
× DELETE
−10 YEN
ADD PRODUCT
CANCEL TRANSACTION
PAY

500
510
OUTPUT DEVICE
512
509
INPUT DEVICE
511
INPUT/OUTPUT INTERFACE
PERIPHERAL DEVICE
503
RAM
508
COMMUNICATION INTERFACE
COMMUNICATION NETWORK
502
ROM
505
STORAGE DEVICE
504
PROGRAM
501
PROCESSOR
507
DRIVE DEVICE
506
RECORDING MEDIUM

INFORMATION PROCESSING SYSTEM, BENEFIT-GRANTING METHOD, AND RECORDING MEDIUM

This application is a National Stage Entry of PCT/JP2022/003282 filed on Jan. 28, 2022, the contents of all of which are incorporated herein by reference, in their entirety.

TECHNICAL FIELD

The present disclosure relates to an information processing system and the like.

BACKGROUND ART

A customer may be provided with a disposable shopping bag to put products purchased at the store. In a case where such a disposable shopping bag is charged, the disposable shopping bag can be registered at a registration device that registers a product by an operation of a store clerk, such as a point of sales (POS) terminal.

In a case where a customer does not utilize a disposable shopping bag, there is a store that grants a benefit to the customer by an operation of a store clerk. For example, PTL 1 discloses a transaction management device that acquires a negative amount defined for an article such as a bag that has not been provided in association with a transaction.

CITATION LIST

Patent Literature

PTL 1: JP 2020-194234

SUMMARY OF INVENTION

Technical Problem

There is scan shopping in which a customer operates a terminal carried by the customer to register a product. In this way, in the terminal that registers the product by the operation of the customer, it is preferable to appropriately grant a benefit when the customer does not receive the provision of the disposable shopping bag from the store.

An object of the present disclosure is to provide an information processing system and the like that appropriately grants a benefit to a customer who does not receive the provision of a disposable shopping bag even when the customer registers a product by himself/herself.

Solution to Problem

An information processing system according to the present disclosure includes a registration means for registering products whose identification information has been inputted by a customer's operation on a portable terminal, an accepting means for accepting necessity of a disposable shopping bag from the portable terminal, a determination means for determining a benefit in response to registration of one or more products in a case where a fact that a disposable shopping bag is unnecessary is accepted, and a granting means for granting the determined benefit when payment for the registered product is made.

A benefit-granting method according to the present disclosure includes registering a product whose identification information is input by a customer's operation on a portable terminal, accepting necessity of a disposable shopping bag from the portable terminal, determining a benefit in response to registration of one or more products in a case where a fact that a disposable shopping bag is unnecessary is accepted, and granting the determined benefit in a case where payment for the registered product is made.

A program according to the present disclosure causes a computer to execute processes of registering a product whose identification information is input by a customer's operation on a portable terminal, accepting necessity of a disposable shopping bag from the portable terminal, determining a benefit in response to registration of one or more products in a case where a fact that a disposable shopping bag is unnecessary is accepted, and granting the determined benefit in a case where payment for the registered product is made. The program may be stored in a computer-readable non-transitory recording medium.

Advantageous Effects of Invention

According to the present disclosure, a benefit can be appropriately granted to a customer who does not receive the provision of a disposable shopping bag even when the customer registers a product by himself/herself.

EXAMPLE EMBODIMENT

Hereinafter, example embodiments of an information processing system, a benefit-granting method, a program, and a recording medium that non-transiently records the program according to the present disclosure will be described with reference to the drawings. The present example embodiment does not limit the technology of the disclosure.

First Example Embodiment

Figure 1:
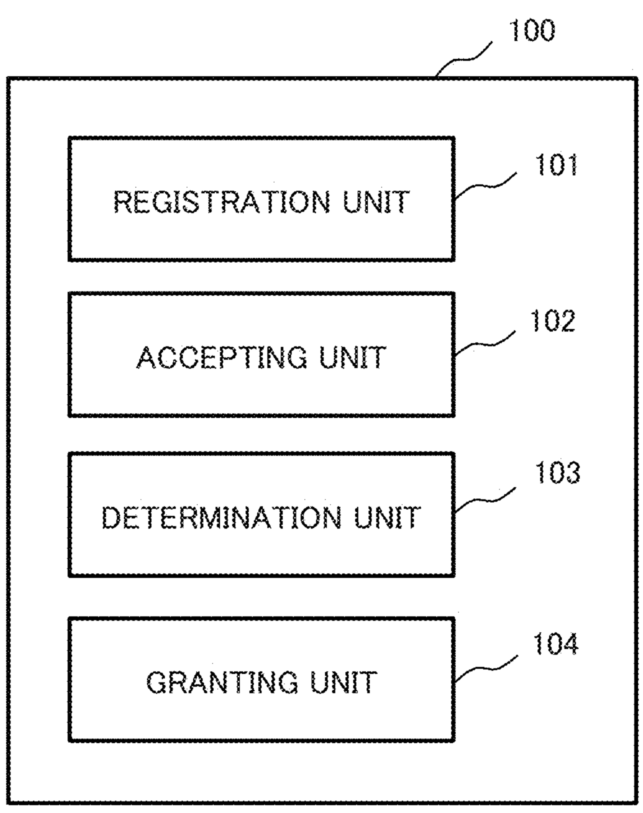
FIG. 1 is a block diagram illustrating a configuration example of an information processing system according to a first example embodiment.

First, in a first example embodiment, a basic function of the information processing system will be described. FIG. 1 is a block diagram illustrating a configuration example of an information processing system 100 according to a first example embodiment. The information processing system 100 includes a registration unit 101, an accepting unit 102, a determination unit 103, and a granting unit 104.

In the first example embodiment, the information processing system 100 grants a benefit in a case where a disposable shopping bag is not provided to a customer who performs an operation of product registration by himself/herself. The disposable shopping bag is a bag provided to a customer at a cash register or the like in order to put the purchased product. The provided disposable shopping bag may be charged or free. The disposable shopping bag includes a paper bag, a plastic bag, and a cloth bag.

In a case where a customer carries a bag for putting a product or in a case where the number of products is small, it is not necessary to provide a disposable shopping bag. The bag carried by the customer may be any bag as long as the product can be put in. The bag is also called "my bag" or "eco-bag". The customer may bring a paper bag, a plastic, cardboard, or a shopping basket as the bag.

The registration unit 101 registers the product whose identification information is input by the customer's operation on a portable terminal. The product registered by the registration unit 101 is a product planned to be purchased by the customer. The portable terminal is a device that can be operated by a customer, and is a device that can be carried by a customer.

The registration unit 101 acquires the identification information of the product from the portable terminal. The identification information of the product is not particularly limited as long as the product can be uniquely identified. The identification information of the product is, for example, a product code, a product name, an image of a product, or the like. Examples of the product code include a Japanese Article Number (JAN) code, a European Article Number (EAN) code, and a Universal Product Code (UPC), but are not particularly limited thereto. The product code may be displayed on the product. In addition, the product code may be encoded into, for example, a one-dimensional code (barcode) or a two-dimensional code and displayed on the product.

The accepting unit 102 accepts the necessity of a disposable shopping bag from the portable terminal. For example, when the fact that a disposable shopping bag is unnecessary is accepted, the accepting unit 102 sets a flag indicating that a disposable shopping bag is unnecessary for each customer. When the fact that the customer utilizes the disposable shopping bag is accepted after the fact that the disposable shopping bag is unnecessary is accepted, the accepting unit 102 may withdraw the set flag. The accepting unit 102 may accept the cancellation of the fact that the disposable shopping bag is unnecessary as the fact that the customer utilizes the disposable shopping bag. When the fact that the disposable shopping bag is utilized is accepted, the accepting unit 102 may set a flag indicating that the disposable shopping bag is provided for each customer.

When the fact that a disposable shopping bag is unnecessary is accepted, the determination unit 103 determines a benefit according to registration of one or more products. For example, when a flag indicating that a disposable shopping bag is unnecessary is set by the accepting unit 102, the determination unit 103 determines whether to grant a benefit. Then, for example, if one or more products are registered, the determination unit 103 determines to grant a benefit.

The determination unit 103 determines a benefit to be granted in a case where payment for the registered product is made. The determined benefit is not particularly limited as long as it gives a profit to the customer. The benefit may be, for example, a discount, a point, or a coupon for the amount of the registered product. The benefit to be granted may be a benefit that can be used at the time of payment of the registered product or a benefit that can be used after payment.

The determination unit 103 may determine a benefit to be granted according to the registered product. For example, the determination unit 103 may determine a benefit according to the number of registered products or the amount of money. The determination unit 103 may determine a benefit that is more beneficial to the customer as the number of registered products is larger or the amount of money is larger.

It is possible to encourage the customer to purchase the product by determining the benefit according to the number of products and the amount of money. The larger the number of products or the larger the amount of money, larger bags or more bags are required to put the products. Therefore, a benefit that is more beneficial to the customer may be granted by as much as the customer does not utilize the disposable shopping bag. This makes it possible to encourage customers to save resources or reduce the utilization of plastic products.

When the fact that the customer utilizes the disposable shopping bag is accepted, the determination unit 103 may determine not to grant the benefit to be granted when the disposable shopping bag is unnecessary. For example, the determination unit 103 may determine to stop the granting of the benefit to be granted in response to the fact that the customer utilizes the disposable shopping bag being accepted after the fact that the disposable shopping bag is unnecessary is accepted.

The granting unit 104 grants the benefit determined by the determination unit 103 in a case where payment for the registered product is made. The granting unit 104 may grant the benefit at the time of payment or may grant the benefit after the payment is completed.

Figure 2:
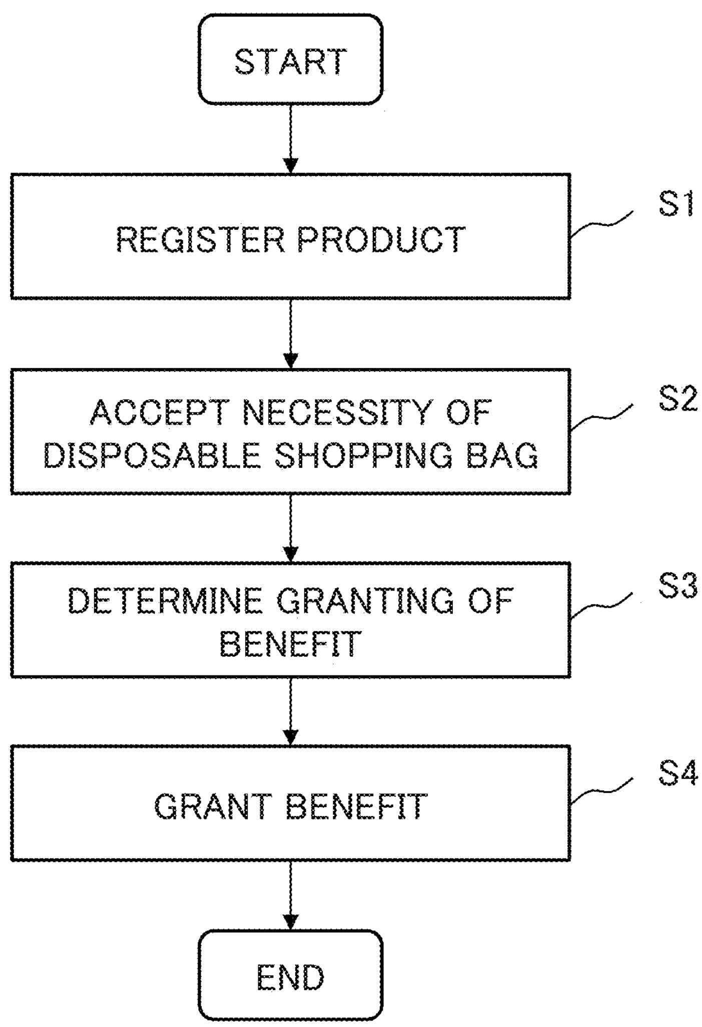
FIG. 2 is a flowchart illustrating an operation example according to the first example embodiment.

FIG. 2 is a flowchart illustrating an operation example of the information processing system 100 according to the first example embodiment.

The registration unit 101 registers the product whose identification information is input by the customer's operation on a portable terminal (step S1). The accepting unit 102 accepts the necessity of a disposable shopping bag from the portable terminal (step S2). The order of step S1 and step S2 may be switched.

When the fact that the disposable shopping bag is unnecessary is accepted, the determination unit 103 determines a benefit to be granted in a case where payment for the registered product is made (step S3). In the first example embodiment, the determination unit 103 executes step S3 after steps S1 and S2. Thereafter, the granting unit 104 grants the determined benefit in a case where payment for the registered product is made (step S4).

It may not be assumed that the benefit is granted even though the product is not registered. For example, in a case where there is no product to be purchased, the purchase amount of the customer becomes negative if a discount in a case where a disposable shopping bag is unnecessary is applied. According to the first example embodiment, in a case where the fact that a disposable shopping bag is unnecessary is accepted, the determination unit 103 determines a benefit according to the registration of one or more products. Then, the granting unit 104 grants the determined benefit in a case where payment for the registered product is made. Therefore, even when the customer registers the product by himself/herself, the benefit can be appropriately granted to the customer who does not receive the provision of the disposable shopping bag.

Second Example Embodiment

Next, as a second example embodiment, an example embodiment including a function of another device that communicates with the information processing system 100 will be described. Hereinafter, regarding the configuration of the information processing system 100 according to the second example embodiment, description of the same configuration as that of the information processing system 100 according to the first example embodiment will be omitted.

Figure 3:
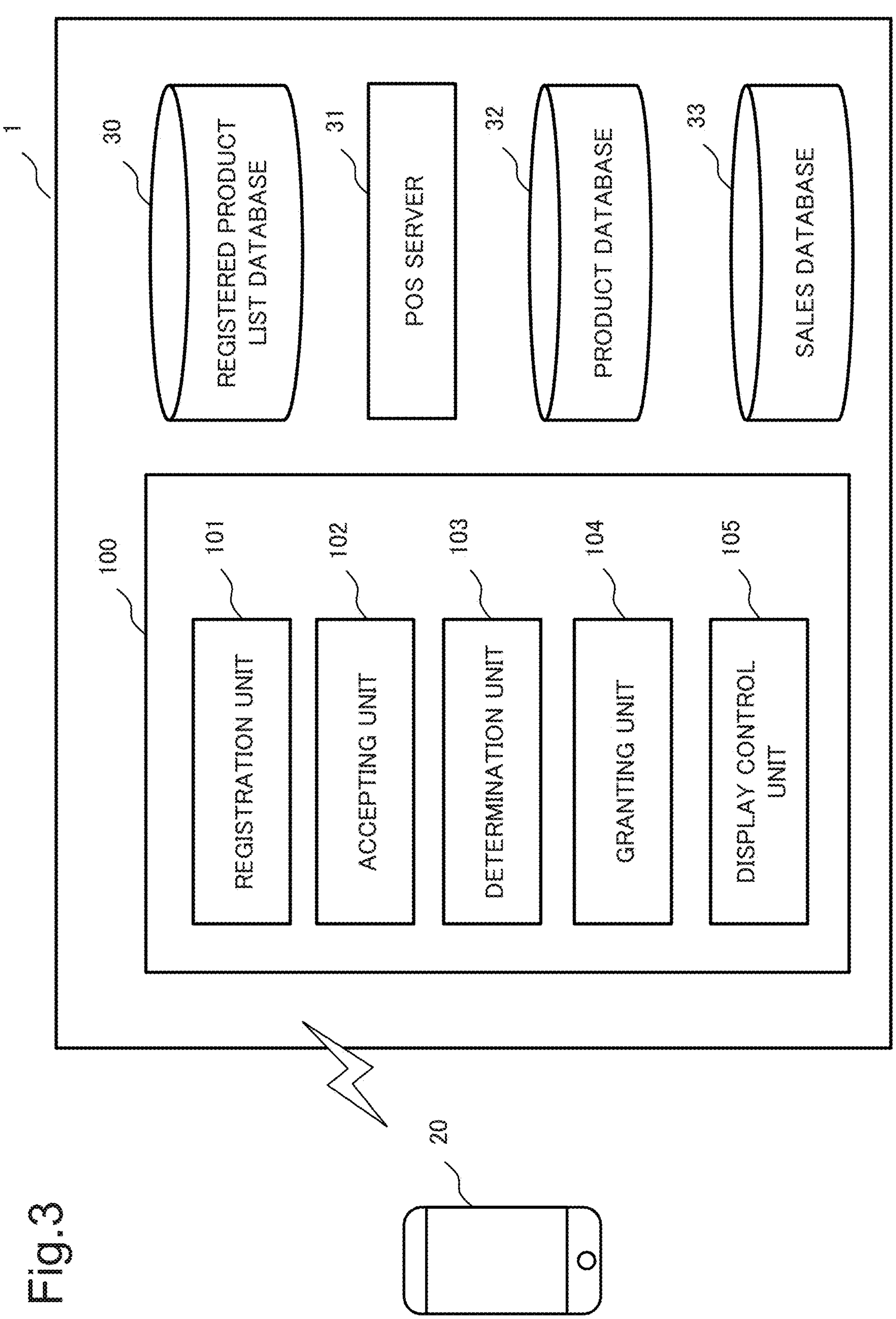
FIG. 3 is a block diagram illustrating a configuration example of a store system according to a second example embodiment.

FIG. 3 is a block diagram illustrating a configuration example of the store system 1 according to the second example embodiment. The store system 1 according to the second example embodiment includes an information processing system 100, a registered product list database 30, a POS server 31, a product database 32, and a sales database 33. The information processing system 100 according to the second example embodiment is different from the information processing system 100 according to the first example embodiment in including a display control unit 105.

The registered product list database 30 stores a registered product list that is a list of registered products for each customer.

The POS server 31 manages, for example, various pieces of information regarding a product sold in a store. In addition to the portable terminal 20, the POS server 31 may also manage registration and settlement of a product using another terminal other than the portable terminal 20, such as a POS terminal operated by a store clerk. That is, in the store, both the existing POS terminal and the portable terminal 20 may be usable for registration and settlement of a product.

The product database 32 stores product identification information and product information for each product in association with each other. For example, in a case where the identification information of the product is a product code, the information of the product is information such as a name of the product and a price of the product. The product information is not particularly limited.

The sales database 33 stores, for example, information regarding sales for each store. The sales database 33 manages, for example, information corresponding to each settlement for each store.

Each of the information processing system 100, the POS server 31, the registered product list database 30, the product database 32, and the sales database 33 is communicably connected by wire or wirelessly as appropriate according to a specific configuration of each system.

The information processing system 100 is communicably connected to the portable terminal 20 by wire or wirelessly. The display control unit 105 controls display on a display included in the portable terminal 20. The portable terminal 20 may be communicably connected to the POS server 31.

Similarly to the portable terminal in the first example embodiment, the portable terminal 20 is a terminal utilized by a customer. The portable terminal 20 is, for example, a mobile terminal such as a smartphone or a tablet. The type of the portable terminal 20 is not particularly limited. The portable terminal 20 may be owned by a customer or may be lent out at a store. The portable terminal 20 may be attached to a shopping basket or a shopping cart, or may be provided integrally with the shopping basket or the shopping cart. In a case where the portable terminal 20 is attached to a shopping cart, the shopping cart may be self-propelled by including, for example, a movable unit such as a tire and a drive device such as a motor.

The portable terminal 20 includes a processing unit and a storage unit. The following functions of the processing unit may be implemented by installing an application program in the storage unit. The processing unit may not have some of the functions described below. Hereinafter, configurations of the store system 1 and the portable terminal 20 will be described in more detail.

<Input of Identification Information>

The processing unit of the portable terminal 20 accepts an input of product identification information. The display control unit 105 may display a screen for accepting the input of the identification information.

The processing unit accepts an input of product identification information via, for example, an imaging device (not illustrated). The imaging device is not particularly limited, but is, for example, a camera included in the portable terminal 20. The processing unit may accept the input of the identification information by reading the one-dimensional code or the two-dimensional code of the product captured by the imaging device. The processing unit may accept the input of the identification information by identifying the product using the image recognition technology from the image of the product captured by the imaging device.

In addition, the processing unit may acquire the identification information by reading a tag to which a radio frequency identifier (RFID) is attached via a reading device (not illustrated). When RFID is used, the reading device is an RFID reader.

Furthermore, the processing unit may accept the product identification information by accepting the selection of the product from the result of the product search. For example, a method of product search is not particularly limited. The product search may be performed by characters or may be performed by images. For example, the processing unit may accept the input of the identification information by accepting the selection of the product from the displayed image of the product.

Furthermore, the processing unit may accept an input of identification information by accepting an input of a number such as a product code via an input device (not illustrated). Examples of the input device include a touch panel display and a keyboard capable of inputting numbers and characters.

The processing unit of the portable terminal 20 transmits the product identification information input as described above to the information processing system 100. For the product registered by transmitting the identification information, the processing unit may display the product information according to the control of the display control unit 105 of the information processing system 100.

<Registration of Product>

The registration unit 101 of the information processing system 100 registers the product based on the identification information received from the portable terminal 20. The information processing system 100 cooperates with the POS server 31, for example, to register a product.

For example, the registration unit 101 transmits the identification information received from the portable terminal 20 to the POS server 31. The POS server 31 refers to the product database 32 and acquires the product information. Then, the POS server 31 transmits the acquired product information to the registration unit 101.

The registration unit 101 uses the product information received from the POS server 31 to register the product to be purchased by the customer. As a process of registering a product, the registration unit 101 generates a registered product list, for example, for each transaction or for each customer. The registration unit 101 stores the registered product list in the registered product list database 30.

<Input of Necessity of Disposable Shopping Bag>

The processing unit of the portable terminal 20 accepts an input of necessity of a disposable shopping bag from a customer. For example, the processing unit displays a screen for accepting the necessity of a disposable shopping bag according to the control of the display control unit 105 of the information processing system 100. Then, the processing unit transmits the necessity of the disposable shopping bag input on the screen to the information processing system 100. The accepting unit 102 of the information processing system 100 accepts the necessity of the disposable shopping bag received from the portable terminal 20.

The display control unit 105 may display a button for accepting the fact that a disposable shopping bag is unnecessary on the screen for accepting the necessity of a disposable shopping bag. The accepting unit 102 accepts the pressing of the button for accepting the fact that a disposable shopping bag is unnecessary as the fact that a disposable shopping bag is unnecessary. After the fact that the disposable shopping bag is unnecessary is accepted, the display control unit 105 may turn off the display of the button for accepting the fact that the disposable shopping bag is unnecessary. As the display control unit 105 turns off the display of the button for accepting the fact that a disposable shopping bag is unnecessary, the accepting unit 102 can be prevented from redundantly accepting the fact that a disposable shopping bag is unnecessary.

The display control unit 105 may display, on the screen for accepting the necessity of a disposable shopping bag, a button for accepting the fact that the customer utilizes the disposable shopping bag or a button for canceling the fact that the disposable shopping bag is unnecessary. The processing unit of the portable terminal 20 may accept the fact that the button is pressed as an input indicating that the customer utilizes the disposable shopping bag. In this case, the accepting unit 102 accepts the fact that the button has been pressed as the fact that the customer utilizes the disposable shopping bag.

The screen for accepting the fact that the customer utilizes the disposable shopping bag may be common with the screen for accepting the input of the identification information. For example, regardless of whether a disposable shopping bag is charged or free, identification information of a product may be assigned to the disposable shopping bag. As an example, a barcode indicating a product code may be attached to a disposable shopping bag. In this case, for example, the processing unit of the portable terminal 20 may accept, as an input indicating that the customer utilizes the disposable shopping bag, that the barcode attached to the disposable shopping bag has been read. Then, the accepting unit 102 accepts that the barcode attached to the disposable shopping bag has been read as the fact that the customer utilizes the disposable shopping bag.

Determination of Benefit

The determination unit 103 may refer to the POS server 31 in determining the benefit to be granted. The POS server 31 may transmit the benefit to be granted to the customer to the determination unit 103. The POS server 31 may transmit, to the determination unit 103, the same benefit as the benefit granted in a case where the payment of the product registered in the POS terminal operated by the store clerk is made and no disposable shopping bag is provided to the customer.

In a case where a product is registered and payment is made in a POS terminal operated by a store clerk, the POS server 31 may control the POS terminal or the like such that a benefit in a case where a disposable shopping bag is not provided is not granted. That is, the determination unit 103 may determine the benefit to be granted only when the product is registered in the portable terminal 20. In this case, the determination unit 103 may not refer to the POS server 31 in determining the benefit to be granted.

With the start of the registration process to the end of the payment as one transaction, a benefit in a case where a disposable shopping bag is not provided is granted only once for one transaction. Therefore, the determination unit 103 may determine not to redundantly grant the benefit per one transaction. That is, the determination unit 103 determines to grant a benefit in a case where a disposable shopping bag is not provided only once per one transaction.

When determining the benefit to be granted, the determination unit 103 may determine the benefit according to the member rank of the customer. The member rank may be set by, for example, the total purchase amount during a predetermined period or the number of times of utilization of the store during the predetermined period. For example, the POS server 31 acquires the member rank of the customer from an arbitrary database. Then, the POS server 31 transmits a benefit determined in advance according to the member rank to the determination unit 103.

The determination unit 103 may determine a benefit that is more beneficial to the customer as the total purchase amount during the predetermined period or the number of times of utilization of the store during the predetermined period is larger. When the benefit is determined according to the purchase amount or the number of times of utilization of the store, the customer can be promoted to utilize the store. In addition, the customer can be encouraged to save resources or reduce the utilization of plastic products.

The determination unit 103 may determine a benefit according to the number of times a customer made a transaction using a portable terminal. The member rank may be set according to the number of times a customer made a transaction using a portable terminal. The determination unit 103 may grant a benefit that is more beneficial to the customer as the number of transactions made using the portable terminal is larger. The customer can be encouraged to utilize the portable terminal by granting a benefit according to the number of transactions made using the portable terminal.

The determination unit 103 may store the determined benefit in the registered product list database 30 in association with the registered product list.

The determination unit 103 may notify the determined benefit to the portable terminal 20 via the display control unit 105. For example, in accordance with the control of the display control unit 105 of the information processing system 100, the processing unit of the portable terminal 20 may display the determined benefit that is granted in a case where a disposable shopping bag is unnecessary.

After the fact that the disposable shopping bag is unnecessary is accepted, the determination unit 103 may notify the portable terminal 20 that the granting of the benefit is stopped in response to accepting the fact that the customer utilizes the disposable shopping bag. The determination unit 103 may perform the notification via the display control unit 105. For example, the display control unit 105 causes the portable terminal 20 to display confirmation as to whether to utilize a disposable shopping bag. The displayed confirmation promotes the customer to confirm whether to actually utilize a disposable shopping bag, for example, when the granting of the benefit is stopped.

The display control unit 105 may display a button for accepting confirmation of utilization of the disposable shopping bag on the screen for displaying confirmation as to whether to utilize the disposable shopping bag. The portable terminal 20 may confirm the utilization of the disposable shopping bag in response to the pressing of the button. The portable terminal 20 transmits confirmation of utilization of the disposable shopping bag to the information processing system 100. The determination unit 103 may determine the stop of the benefit to be granted in response to the reception of the confirmation of the utilization of the disposable shopping bag.

<Process Related to Payment>

Furthermore, the processing unit of the portable terminal 20 executes processes related to payment of the registered product. Hereinafter, a case where payment is performed via a payment server and a case where payment is performed using a settlement device installed in a store will be described. However, the payment method is not limited thereto.

The processing unit of the portable terminal 20 communicates with a payment server (not illustrated) as a process related to payment and instructs the payment server to make a payment. For example, the processing unit of the portable terminal 20 transmits the payment instruction including the payment information and the settlement information to the payment server. The payment information is information for specifying a customer's credit card, debit card, electronic money, point, or the like. The settlement information is information for specifying the registered product or the purchase amount of the registered product. The payment server performs cashless payment. For example, the payment server notifies the portable terminal 20 and the POS server 31 of the completion of the payment.

The processing unit of the portable terminal 20 may instruct payment via the POS server 31 or the information processing system 100. A part or all of the functions of the payment server may be achieved by the information processing system 100 or the POS server 31.

In a case where a payment is made using the settlement device installed in the store, the processing unit of the portable terminal 20 may output settlement information to the settlement device as a process related to the payment. The settlement device executes payment by an arbitrary method such as cash payment or cashless payment based on the settlement information. For example, the settlement device notifies the portable terminal 20 and the POS server 31 of the completion of the payment.

A method of outputting the settlement information to the settlement device is not particularly limited. For example, the processing unit may display a barcode in which the settlement information is encoded or a two-dimensional code on the display of the portable terminal 20. Alternatively, the processing unit may transmit the settlement information to the settlement device by wireless communication such as near field communication (NFC), Wi-Fi (registered trademark), or Bluetooth (registered trademark).

The POS server 31 stores information corresponding to the settlement in the sales database 33.

Granting of Benefit

The granting unit 104 grants a benefit in a case where payment for the registered product is made.

For example, the granting unit 104 causes the portable terminal 20 or the POS server 31 to execute payment with the amount of money to which the benefit related to discount has been granted as the granting of the benefit.

Alternatively, the granting unit 104 may grant a benefit in response to completion of the payment. For example, the granting unit 104 may grant a benefit such as a coupon or a point in response to reception of completion of payment from the portable terminal 20 or the POS server 31.

For example, the granting unit 104 stores the granted benefit in the sales database 33. The granting unit 104 may cooperate with the POS server 31 to store the granted benefit. That is, the granting unit 104 transmits information regarding the granted benefit to the POS server 31. Then, the POS server 31 stores the granted benefit in the sales database 33.

For example, the sales database 33 stores information in which information related to a benefit granted in a case where a disposable shopping bag is unnecessary is included in the information corresponding to each settlement. Since the granted benefit is stored in the sales database 33, the manager of the store can manage information related to the granted benefit. For example, the manager of the store can manage the proportion of customers who have registered the product using the portable terminal, the proportion of customers who have not received the provision of the disposable shopping bag, and the like.

The configurations of the store system 1 and the portable terminal 20 have been described above. Some or all of the functional units of the information processing system 100 including the registration unit 101, the accepting unit 102, the determination unit 103, the granting unit 104, and the display control unit 105 may be achieved by a processing unit of the portable terminal.

The information processing system 100 may be achieved by an information processing device separate from the registered product list database 30, the POS server 31, the product database 32, and the sales database 33. When the information processing system 100 is achieved by a separate device, the amount of data processed in the information processing system 100 can be reduced, and the load can be reduced.

Alternatively, the information processing system 100 and the POS server 31 may be achieved by a single device. Each database of the store system 1 may be included in the information processing system 100 or the POS server 31. Alternatively, each database of the store system 1 may be achieved by a device separate from the information processing system 100 and the POS server 31.

The device constituting the store system 1 may be installed, for example, in the backyard of the store, but the installing location is not particularly limited. A part or all of the devices constituting the store system 1 may be installed in a place other than the store.

Figure 4:
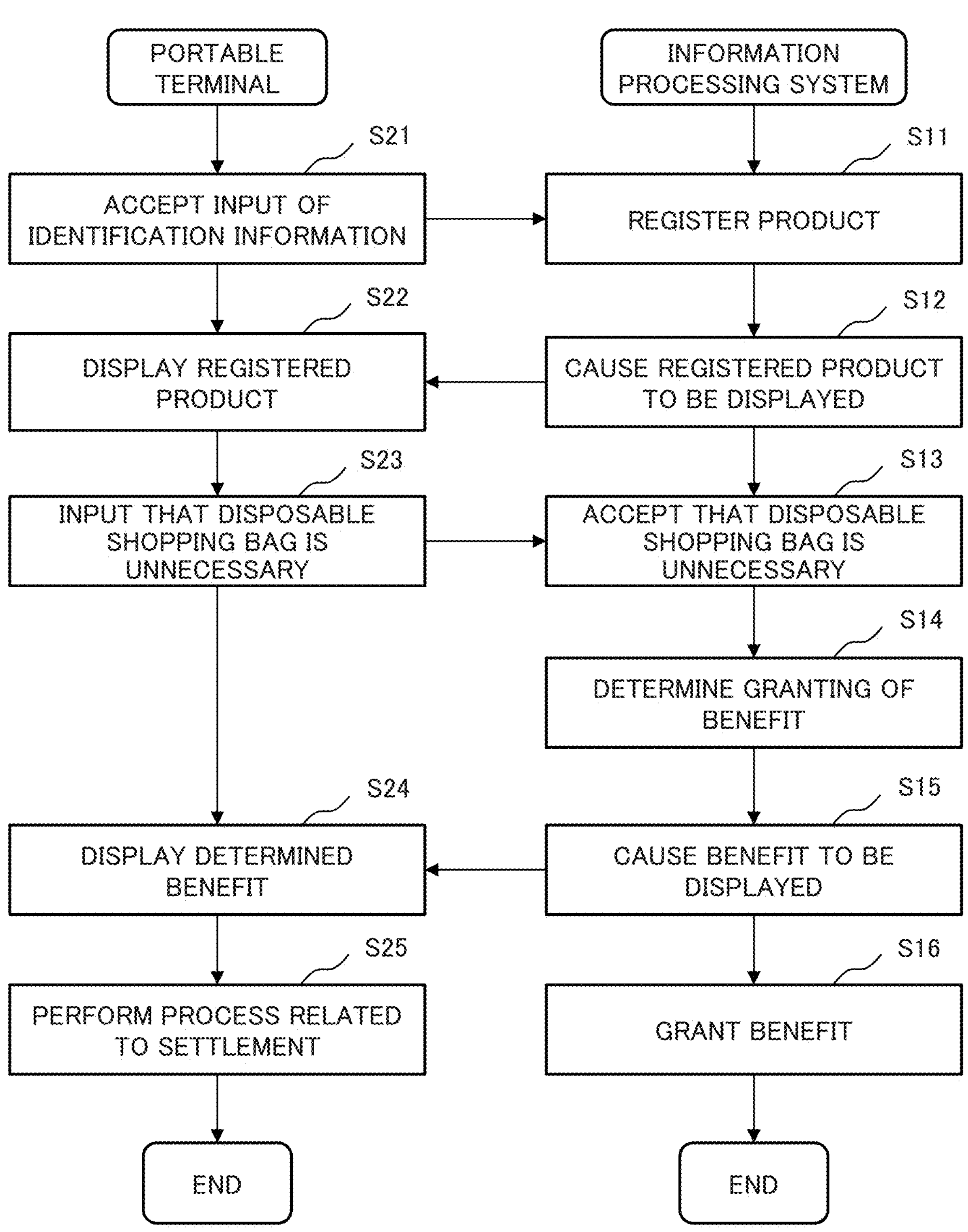
FIG. 4 is a flowchart illustrating an operation example according to the second example embodiment.

Next, an operation example according to the second example embodiment will be described. FIG. 4 is a flowchart illustrating an operation example of the information processing system 100 and the portable terminal 20 according to the second example embodiment.

Figure 5:
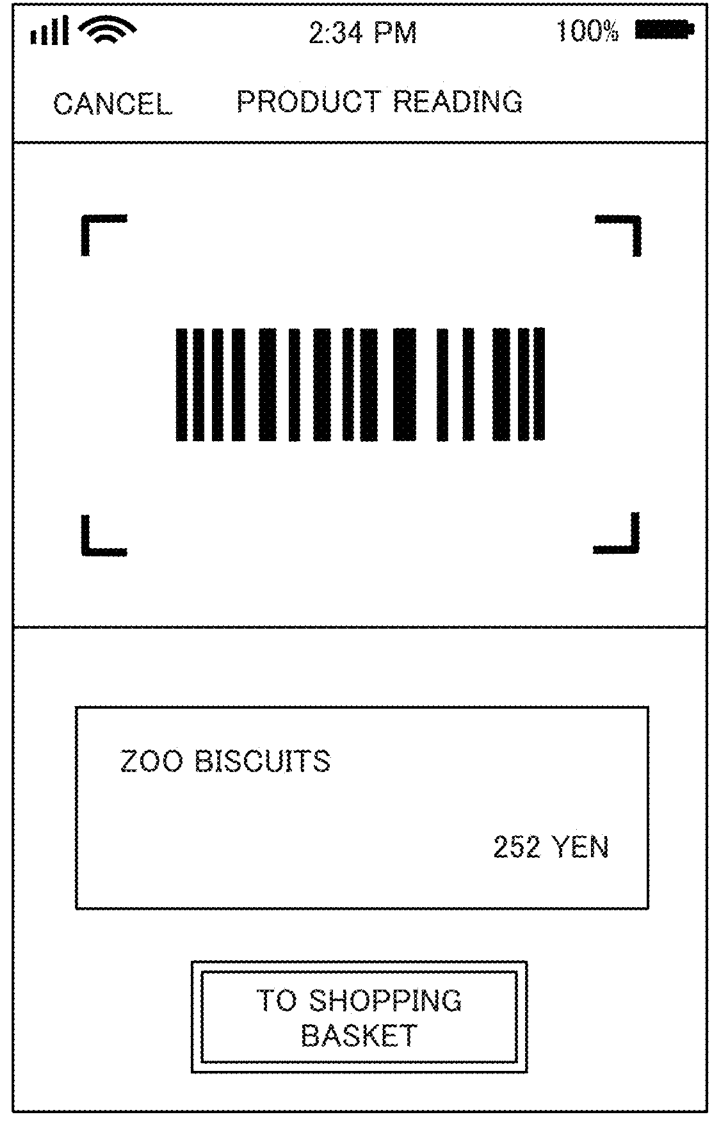
FIG. 5 is a diagram illustrating an example of a read screen of a product code.

First, the portable terminal 20 accepts the input of the identification information of the product according to the operation of the customer (step S21). In order to accept the input of the identification information, for example, the portable terminal 20 reads the product code. FIG. 5 is a diagram illustrating an example of a read screen of the product code displayed on the portable terminal 20. For example, the display control unit 105 causes the portable terminal 20 to display a read screen before step S21. In FIG. 5, the barcode attached to the product is read, and information regarding the read barcode is displayed.

Returning to FIG. 4, the portable terminal 20 transmits the input identification information to the information processing system 100. The registration unit 101 of the information processing system 100 registers the product whose identification information is input by the customer's operation on the portable terminal 20 (step S11).

The display control unit 105 causes the portable terminal 20 to display the product registered by the registration unit 101 (step S12). For example, the display control unit 105 transmits information of the registered product to the portable terminal 20.

In step S12, the display control unit 105 may further cause the portable terminal 20 to display a display such as a button for accepting the necessity of a disposable shopping bag. For example, the display control unit 105 may cause the same screen as the screen displaying the registered product to display a display for accepting the fact that a disposable shopping bag is unnecessary.

The portable terminal 20 displays the registered product according to the control of the display control unit 105 (step S22). In step S22, the portable terminal 20 may perform display of accepting the necessity of a disposable shopping bag on the same screen as the screen displaying the registered product.

When the customer purchases a plurality of products, the portable terminal 20 repeats steps S21 and S22. Step S21 may be executed after step S23 and step S24 described later. In response to the execution of step S21, the information processing system 100 executes steps S11 and S12.

Figure 6:
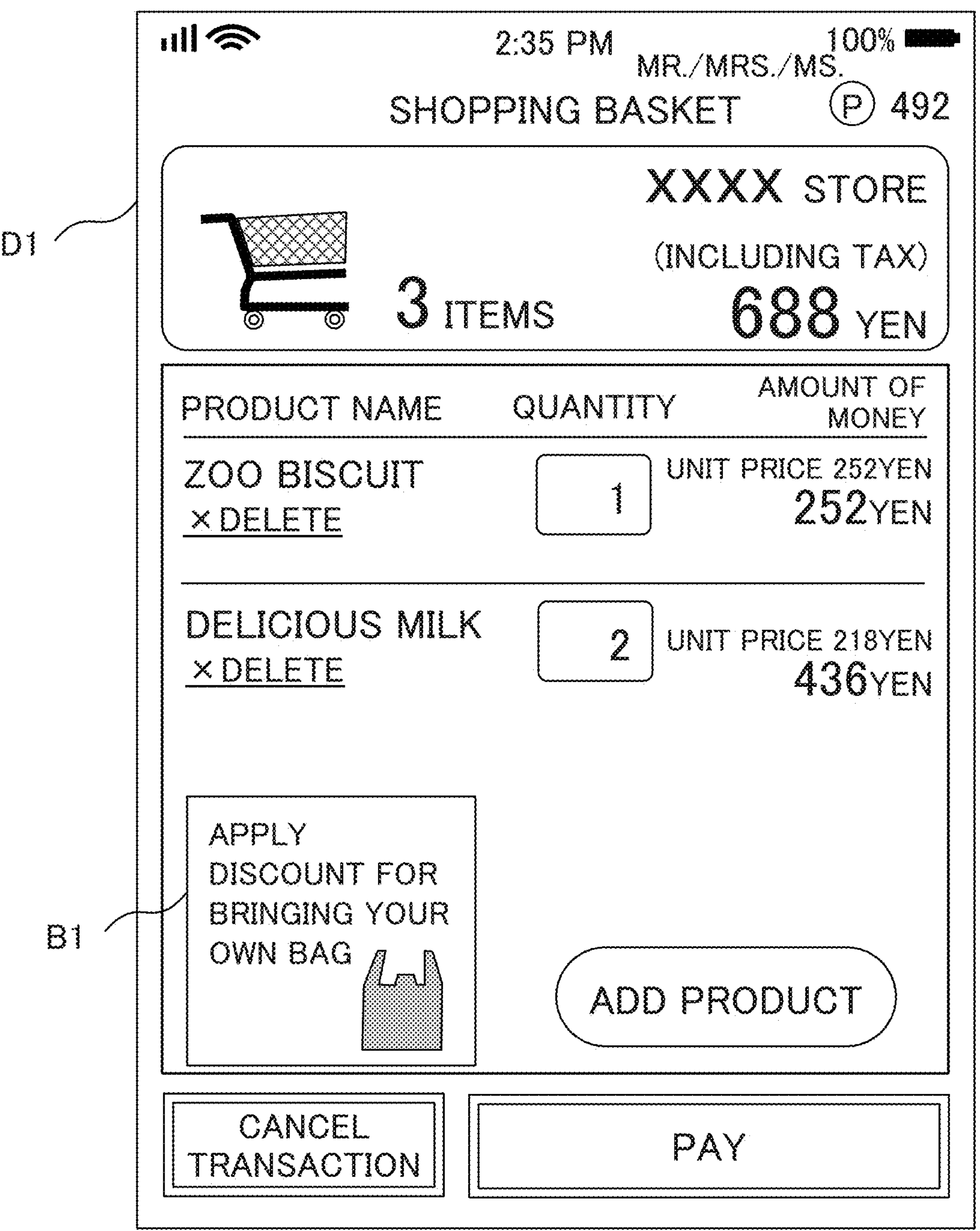
FIG. 6 is a diagram illustrating an example of a screen displaying registered products.

FIG. 6 is a diagram illustrating an example of a screen D1 that displays registered products. The screen D1 includes information such as the name, purchase quantity, and price of the registered products, the total number of products, and the total amount of the products. The screen D1 of FIG. 6 includes, for example, a "add product" button and the like. For example, when various buttons are tapped, the processing unit of the portable terminal 20 determines that an instruction corresponding to the button has been accepted, and transmits the instruction to the information processing system 100. The "add product" button is a button for accepting a reading instruction. The reading instruction here is an instruction to newly read identification information of a product.

For example, when the "add product" button is tapped, the processing unit of the portable terminal 20 transmits a reading instruction to the information processing system 100. As a result, the read screen illustrated in FIG. 5 is newly displayed on the portable terminal 20 by the display control unit 105. Then, the portable terminal 20 can read the identification information of the product.

Returning to FIG. 4, the portable terminal 20 accepts an input of a fact that a disposable shopping bag is unnecessary (step S23).

The screen D1 of FIG. 6 includes an unnecessary button B1 for a disposable shopping bag as an example of a display for accepting the fact that a disposable shopping bag is unnecessary. "Apply discount for bringing your own bag" is displayed on the unnecessary button B1 of the disposable shopping bag in FIG. 6. The display mode of the display for accepting the fact that a disposable shopping bag is unnecessary is not particularly limited. For example, the portable terminal 20 accepts the tapping of the unnecessary button B1 for the disposable shopping bag in FIG. 6. Then, the portable terminal 20 transmits the fact that the disposable shopping bag is unnecessary to the information processing system 100.

The accepting unit 102 accepts that the disposable shopping bag is unnecessary from the portable terminal 20 (step S13). Thereafter, the determination unit 103 determines the benefit granted when the payment of the registered product is made (step S14).

The display control unit 105 causes the portable terminal 20 to display the determined benefit (step S15). For example, the display control unit 105 transmits information on the determined benefit to the portable terminal 20. The display control unit 105 may display the determined benefit on the screen displaying the registered product.

The portable terminal 20 displays the determined benefit according to the control of the display control unit 105 (step S24). In step S24, the portable terminal 20 may display the determined benefit on the screen displaying the registered product.

Figure 7:
FIG. 7 is a diagram illustrating another example of a screen displaying registered products.

FIG. 7 is a diagram illustrating another example of the screen D1 for displaying the registered product. The screen of FIG. 7 may be displayed after the button for accepting the fact that the disposable shopping bag is unnecessary in FIG. 6 is pressed. In FIG. 7, as a benefit granted when the disposable shopping bag is unnecessary, discount "−10 yen" with respect to the cost of the registered product is displayed.

Returning to FIG. 4, after step S24, the portable terminal 20 executes a process related to the payment of the registered product (step S25).

The screen D1 of FIG. 6 and FIG. 7 includes "pay" button. The "pay" button is a button for accepting the payment instruction. The payment instruction is an instruction for performing a process related to payment after product registration is finished.

For example, when the customer completes the registration of the product, the customer taps "pay" button in FIG. 7. The portable terminal 20 may execute a process related to payment in response to the tapping of the "pay" button. The portable terminal 20 may notify the information processing system 100 of the start of the process related to payment or the end of payment. Furthermore, the portable terminal 20 may notify the information processing system 100 of the start of the process related to payment or the end of payment via the POS server 31.

The granting unit 104 grants the determined benefit when payment of the registered product is made (step S16). For example, the granting unit 104 applies discount with respect to the amount of money of the registered product.

Upon ending of the process related to payment or completion of granting of the benefit, the portable terminal 20 and the information processing system 100 end the process.

In the operation example described above, a case where a display accepting the fact that the disposable shopping bag is unnecessary is made on the same screen as the screen displaying the registered product has been described. Furthermore, in the operation example described above, a case where a display for accepting the fact that the disposable shopping bag is unnecessary is made in the product registration process has been described. However, the screen for displaying the registered product and the screen for accepting the necessity of the disposable shopping bag may be separately displayed.

Figure 8:
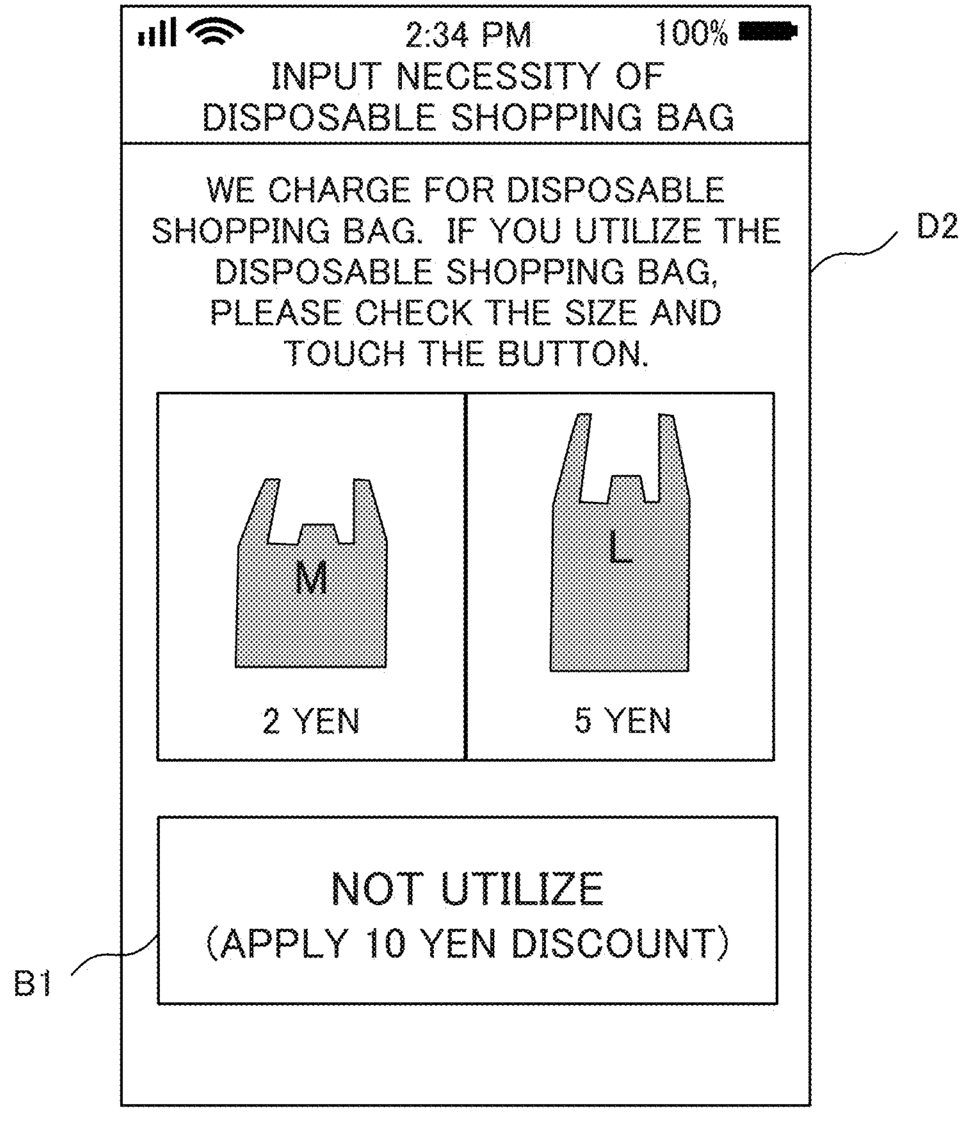
FIG. 8 is a diagram illustrating an example of a screen for accepting necessity of a disposable shopping bag.

FIG. 8 is a diagram illustrating a screen D2 for accepting the necessity of the disposable shopping bag.

The screen D2 of FIG. 8 includes a button for selecting a disposable shopping bag to utilize as a display for accepting the fact that the disposable shopping bag is utilized. In response to the selection of the disposable shopping bag to be utilized, the portable terminal 20 transmits, for example, information indicating that the customer utilizes the plastic bag to the information processing system 100. The display mode of the display for accepting the fact that a disposable shopping bag is utilized is not limited thereto.

The screen D2 includes an unnecessary button B1 for a disposable shopping bag as an example of a display for accepting the fact that a disposable shopping bag is unnecessary. "Not utilize (apply 10 yen discount)" is displayed on the unnecessary button B1 for the disposable shopping bag in FIG. 8.

As an example, the screen for accepting the necessity of a disposable shopping bag may be displayed after the end of the product registration process and before the start of the process related to payment. For example, a screen D2 for accepting the necessity of a disposable shopping bag as illustrated in FIG. 8 may be displayed in response to tapping of the "pay" button in FIG. 7.

As another example, a screen D2 for accepting the necessity of a disposable shopping bag may be displayed before the start of the product registration process. For example, a screen for accepting the necessity of a disposable shopping bag is displayed before the display of the reading screen for the product code of FIG. 5. After the unnecessary button B1 of the disposable shopping bag is tapped on the screen D2 of FIG. 8, the reading screen of FIG. 5 may be displayed on the portable terminal 20. In this case, step S23 is executed before step S21.

The screen of FIG. 8 may be displayed at the time of product registration. After the unnecessary button B1 of the disposable shopping bag is tapped in D2 of FIG. 8, the screen of the screen D1 of FIG. 7 may be displayed on the portable terminal 20.

In the above operation example, the case where a disposable shopping bag is unnecessary has been described. However, the accepting unit 102 may accept the fact that the customer utilizes the disposable shopping bag after accepting the fact that the shopping bag is unnecessary. Therefore, another operation example of the information processing system 100 will be described.

Figure 9:
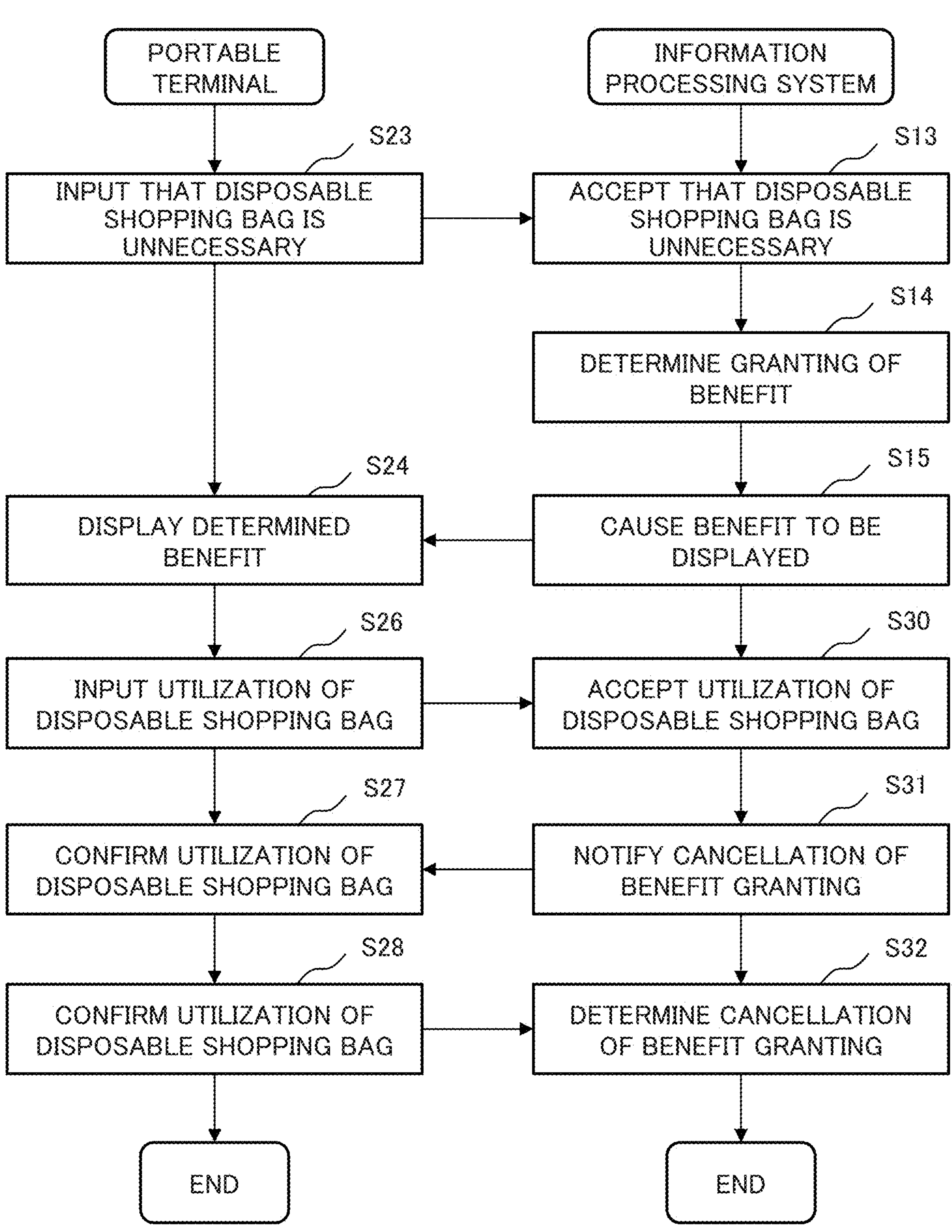
FIG. 9 is a flowchart illustrating an operation example related to input of necessity of a disposable shopping bag.

FIG. 9 is a flowchart illustrating an operation example related to input of necessity of a disposable shopping bag in the second example embodiment. In FIG. 9, processes related to product registration and payment are omitted. In addition, in FIG. 9, since the processes in steps S23 to S24 and steps S13 to S15 are similar to the corresponding steps in FIG. 4, the description thereof will be omitted.

After step S24, the portable terminal 20 accepts an input related to utilization of a disposable shopping bag (step S26). Then, the portable terminal 20 transmits the fact that the disposable shopping bag is utilized to the information processing system 100.

Figure 10:
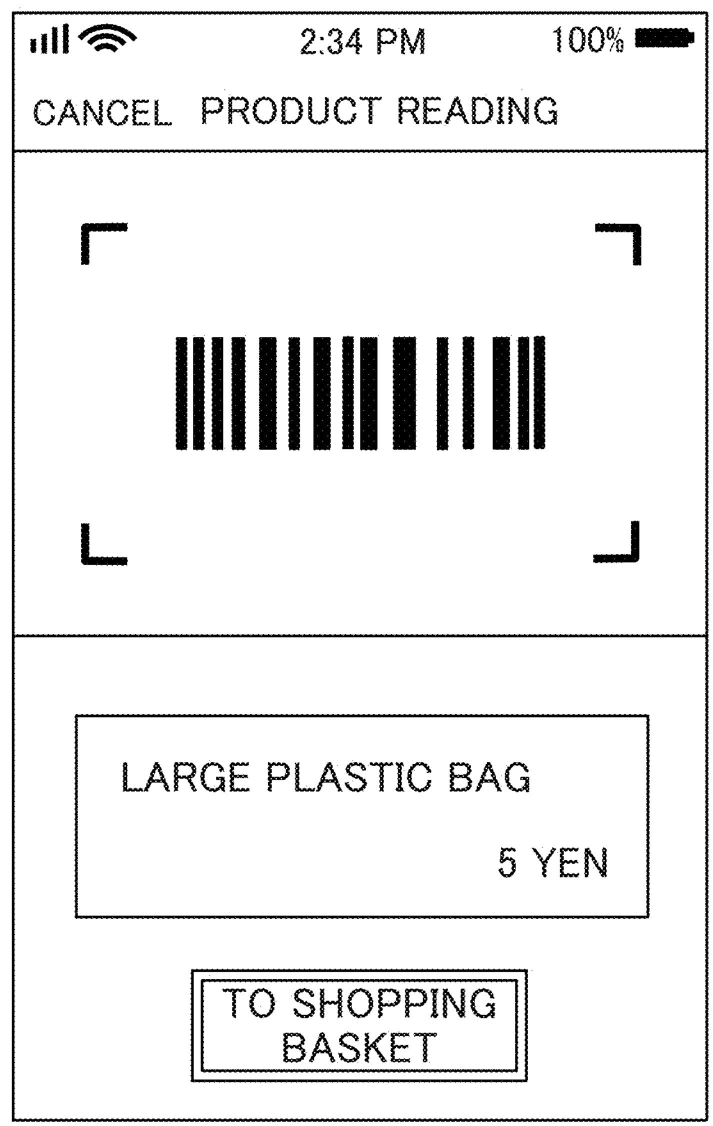
FIG. 10 is a diagram illustrating an example of a screen for accepting utilization of a disposable shopping bag.

Any of the methods described above may be adopted as a method of accepting an input related to the utilization of a disposable shopping bag. As an example, in step S26, for example, the portable terminal 20 accepts that the barcode has been read as an input indicating that the customer utilizes the disposable shopping bag. FIG. 10 is a diagram illustrating an example of a screen for accepting the fact that the disposable shopping bag is utilized, FIG. 10 illustrates a reading screen of a product code similar to that in FIG. 5. In FIG. 10, a barcode attached to an L-sized plastic bag, which is an example of a disposable shopping bag, is read.

The accepting unit 102 accepts, from the portable terminal 20, the fact that the customer utilizes the disposable shopping bag (step S30). After accepting the fact that the disposable shopping bag is unnecessary, the accepting unit 102 notifies the portable terminal 20 that the granting of the benefit is stopped in response to the acceptance of the fact that the customer utilizes the disposable shopping bag (step S31). In step S31, the display control unit 105 causes the portable terminal to display a confirmation as to whether to utilize a disposable shopping bag.

The portable terminal 20 displays confirmation on the utilization of a disposable shopping bag (step S27).

Figure 11:
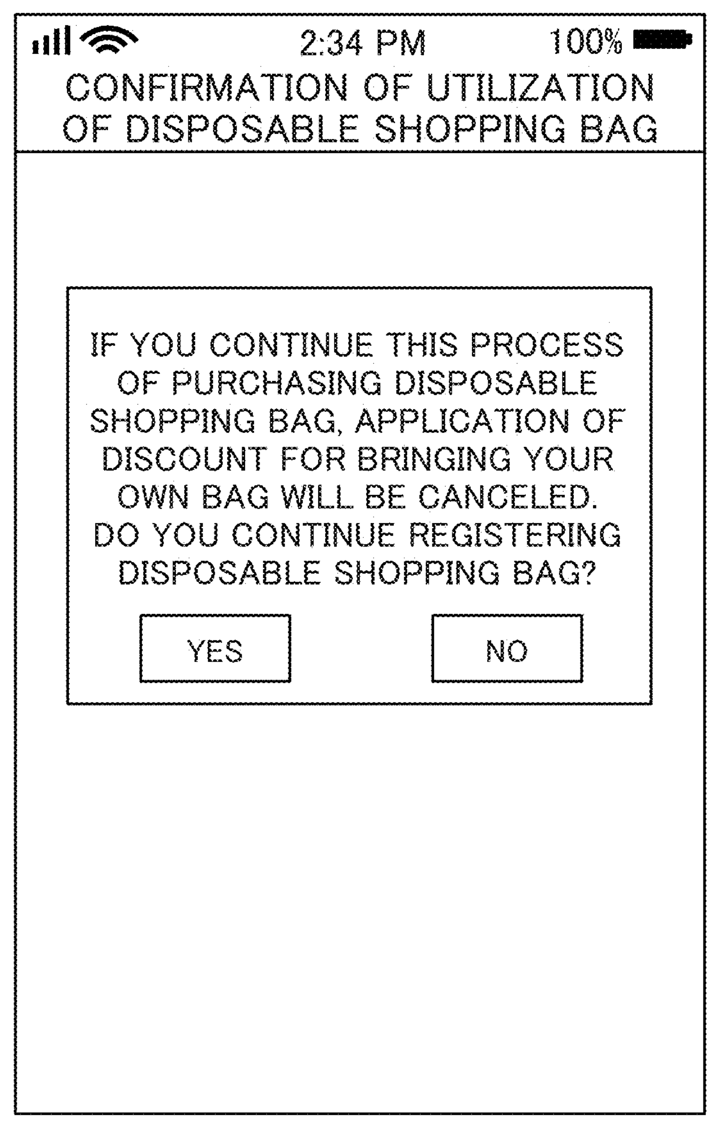
FIG. 11 is a diagram illustrating an example of a screen for confirming whether to utilize a disposable shopping bag.

FIG. 11 is a diagram illustrating an example of a screen for confirming whether to utilize a disposable shopping bag. The screen of FIG. 11 may be displayed, for example, after the product code of the disposable shopping bag is read on the screen of FIG. 10. The screen of FIG. 11 prompts the user to confirm whether to actually utilize the disposable shopping bag when the granting of the benefit is stopped.

Returning to FIG. 9, after step S27, the portable terminal 20 confirms the utilization of the disposable shopping bag (step S28). The portable terminal 20 transmits confirmation of utilization of the disposable shopping bag to the information processing system 100. For example, in FIG. 11, in a case where the customer taps "Yes" to the question "Do you want to continue registration of the disposable shopping bag?", the portable terminal 20 confirms the utilization of the disposable shopping bag.

For example, the determination unit 103 determines to stop the granting of the benefit in response to reception of confirmation of the utilization of the disposable shopping bag from the portable terminal 20 (step S32).

As described above, the portable terminal 20 and the information processing system 100 end the processes related to the acceptance on the utilization of the disposable shopping bag. After step S27, in the portable terminal 20, for example, processes related to payment are performed. In a case where payment is made, a benefit due to the disposable shopping bag being unnecessary is not granted.

In FIG. 11, in a case where the customer taps "No", the portable terminal 20 may transmit, for example, the fact that the utilization of the disposable shopping bag is canceled to the information processing system 100. The accepting unit 102 may accept the cancellation of the utilization of the disposable shopping bag as the fact that the disposable shopping bag is unnecessary. Alternatively, the portable terminal 20 may transmit, to the information processing system 100, the fact that a disposable shopping bag is unnecessary. At this time, the accepting unit 102 accepts that a disposable shopping bag is unnecessary.

As described above, according to the second example embodiment, the portable terminal 20 accepts an input related to the disposable shopping bag being unnecessary. In a case where the fact that a disposable shopping bag is unnecessary is accepted, the determination unit 103 determines a benefit to be granted in a case where payment for the registered product is made. Furthermore, the granting unit 104 grants the determined benefit in a case where payment for the registered product is made. Therefore, even when the customer registers the product by himself/herself, the benefit can be appropriately granted to the customer who does not receive the provision of the disposable shopping bag.

According to the second example embodiment, the accepting unit 102 accepts the fact that the customer utilizes the disposable shopping bag after accepting the fact that the disposable shopping bag is unnecessary. Then, the determination unit 103 determines to stop granting the benefit.

Therefore, a benefit can be appropriately granted according to whether the customer utilizes a disposable shopping bag.

MODIFIED EXAMPLE

Each of the above example embodiments may be modified and used. The modified examples will be described below.

In one modified example, the information processing system 100 may further include a decision unit for deciding that the customer has brought a bag. For example, the decision unit decides that the customer brought the bag based on the recognition of the bag from an image obtained by photographing the bag brought by the customer. The granting unit 104 may grant the benefit in response to the decision that the customer brought the bag.

The decision unit may accept an image obtained by photographing the bag from an arbitrary camera installed in the store. The decision unit may accept an image of the bag from the portable terminal 20. In this case, the camera included in the portable terminal 20 may photograph the bag brought by the customer. For example, the processing unit of the portable terminal 20 photographs an image by the operation of the customer and transmits the photographed image to the information processing system 100. For example, the decision unit notifies the granting unit 104 of a result of recognizing the bag from the received image.

When the bag is recognized, the decision unit can decide whether the customer brought some kind of bag. Thus, the granting unit 104 can prevent a benefit from being granted to a customer who did not bring a bag.

The decision unit may further decide whether the registered product can be put in the bag based on the capacity of the bag estimated from the image obtained by photographing the bag brought by the customer. The granting unit 104 may grant a benefit in a case where it is decided that the registered product can be put in the bag.

For example, it is assumed that a customer puts a product in a bag of a predetermined type. In this case, the decision unit may specify the type of the bag from the image using an existing image recognition technology. Then, the decision unit acquires the volume of the bag stored in advance according to the type of the bag.

Alternatively, the volume of the bag can be estimated by the decision unit measuring the size of the bag using an existing technique related to measurement of the size based on an image.

Furthermore, the decision unit refers to, for example, the volume of the product stored in the product database 32, and acquires the volume of the registered product. Then, when the volume of the registered product is smaller than the volume of the bag, it may be decided that the registered product can be put in the bag. Then, the decision unit notifies the granting unit 104 of the decision result.

The granting unit 104 grants the benefit in a case where decision is made that the registered product can be put in the bag, whereby the benefit can be prevented from being granted, for example, to a customer who needs a disposable shopping bag because the product cannot all be put in the bag.

In a case where the number of registered products exceeds a predetermined number, the decision unit may accept the image of the bag brought by the customer. This is because, in a case where the number of registered products does not exceed a predetermined number, for example, in a case where the number of registered products is one or two, the customer can bring back the products even if there is no bag brought by the customer. The predetermined number serving as the threshold value is arbitrarily set according to the store.

The display control unit 105 may start the camera of the portable terminal 20 in a case where the number of registered products exceeds a predetermined number.

The information processing system 100 that grants a benefit in a case where a disposable shopping bag is not provided in a store has been described above. However, the present disclosure is also applicable to a case where another container other than a disposable shopping bag, such as a plastic container, cardboard, or a shopping basket, is provided in a store. The plastic container is, for example, an arbitrary container used for putting food and drink provided in a store. That is, the information processing system 100 may grant a benefit in a case where a container is not provided to a customer who registers the product by himself/herself.

[Hardware Configuration]

In each of the example embodiments described above, each component of the information processing system 100 indicates a block of a functional unit. Some or all of the components of the information processing system 100 may be achieved by an arbitrary combination of the computer 500 and a program.

Figure 12:
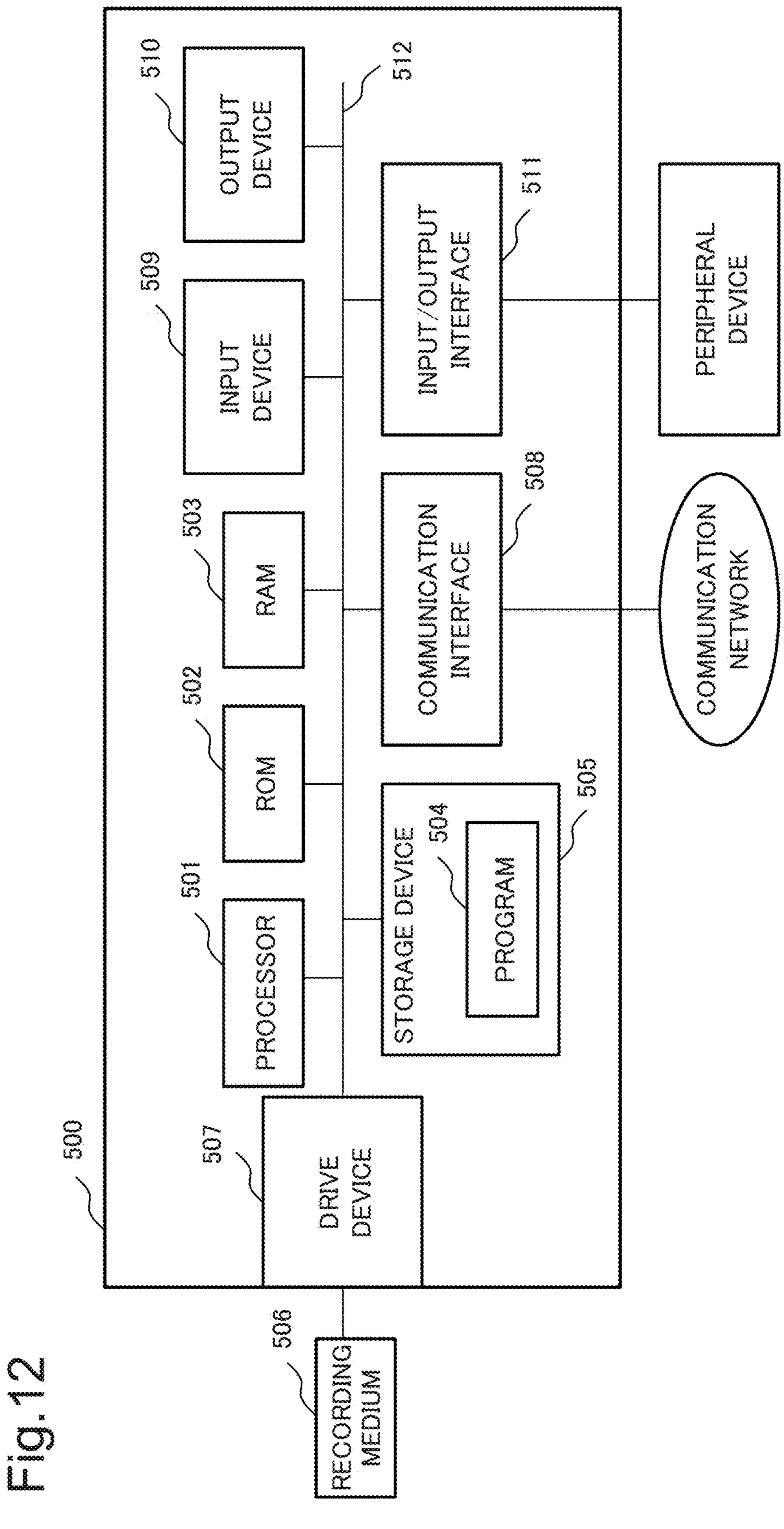
FIG. 12 is a block diagram illustrating an example of a hardware configuration of a computer.

FIG. 12 is a block diagram illustrating an example of a hardware configuration of a computer 500. Referring to FIG. 12, the computer 500 includes, for example, a processor 501, a read only memory (ROM) 502, a random access memory (RAM) 503, a program 504, a storage device 505, a drive device 507, a communication interface 508, an input device 509, an input/output interface 511, and a bus 512.

The processor 501 controls the entire computer 500. Examples of the processor 501 include, for example, a central processing unit (CPU) and the like. The number of processors 501 is not particularly limited, and the number of processors 501 is one or more.

The program 504 includes a command (instruction) for achieving each function of the information processing system 100. The program 504 is stored in advance in the ROM 502, the RAM 503, and the storage device 505. The processor 501 achieves each function of the information processing system 100 by executing commands included in the program 504. The RAM 503 may store data to be processed by each function of the information processing system 100. For example, the registered product list may be stored in the RAM 503 of the computer 500. The number of read only memories (ROMs) 502, random access memories (RAMs) 503, and storage devices 505 is not particularly limited, and is one or more.

The drive device 507 reads and writes the recording medium 506. The communication interface 508 provides an interface with a communication network. The input device 509 is, for example, a mouse, a keyboard, or the like, and receives an input of information from a manager or the like. The output device 510 is, for example, a display, and outputs (displays) information to a manager or the like. The input/output interface 511 provides an interface with a peripheral device. The bus 512 connects the components of the hardware. The program 504 may be supplied to the CPU 501 via a communication network, or may be stored in the recording medium 506 in advance, read by the drive device 507, and supplied to the CPU 501.

The hardware configuration illustrated in FIG. 12 is an example, and other components may be added or some components may not be included.

There are various modified examples for the method for achieving the information processing system 100. For example, the information processing system 100 may be achieved by an arbitrary combination of a computer and a program different for each component. A plurality of components included in the information processing system 100 may be achieved by an arbitrary combination of one computer and a program.

Although the present disclosure has been described with reference to the example embodiments, the present disclosure is not limited to these example embodiments. Various changes that can be understood by those skilled in the art can be made to the configuration and details of the present disclosure within the scope of the present disclosure. The configurations in the example embodiments can be combined with each other without departing from the scope of the present disclosure.

Some or all of the above example embodiments can be described as the following supplementary notes, but are not limited to the following.

Supplementary Note 1

An information processing system including
- a registration means for registering a product whose identification information is input by a customer's operation on a portable terminal,
- an accepting means for accepting necessity of a disposable shopping bag from the portable terminal,
- a determination means for determining a benefit in response to registration of one or more products in a case where a fact that a disposable shopping bag is unnecessary is accepted, and
- a granting means for granting the determined benefit in a case where payment for the registered product is made.

Supplementary Note 2

The information processing system according to supplementary note 1, in which
- the determination means determines to stop granting of the benefit in response to accepting a fact that the customer utilizes a disposable shopping bag, after accepting the fact that the disposable shopping bag is unnecessary.

Supplementary Note 3

The information processing system according to supplementary note 1 or 2, further including
- a display control means for causing the portable terminal to display a button for accepting the fact that a disposable shopping bag is unnecessary, in which
- the accepting means accepts pressing of the button as a fact that a disposable shopping bag is unnecessary.

Supplementary Note 4

The information processing system according to supplementary note 3, in which
- the display control means turns off the display of the button after the fact that the disposable shopping bag is unnecessary is accepted.

Supplementary Note 5

The information processing system according to any one of supplementary notes 1 to 4, further including
- a display control means for causing the portable terminal to display confirmation as to whether to utilize a disposable shopping bag in response to accepting the fact that the customer utilizes the disposable shopping bag, after the fact that the disposable shopping bag is unnecessary is accepted.

Supplementary Note 6

The information processing system according to any one of supplementary notes 1 to 5, in which
- the determination means determines the benefit according to a member rank of the customer.

Supplementary Note 7

The information processing system according to any one of supplementary notes 1 to 6, in which
- the determination means determines the benefit according to number of times the customer performed a transaction using the portable terminal.

Supplementary Note 8

The information processing system according to any one of supplementary notes 1 to 7, in which
- the determination means determines the benefit according to the number of the registered products.

Supplementary Note 9

The information processing system according to any one of supplementary notes 1 to 8, in which
- the determination means determines the benefit according to an amount of money of the registered products.

Supplementary Note 10

The information processing system according to any one of supplementary notes 1 to 9, further including:
- a decision means for deciding that the customer has brought a bag based on recognition of the bag from an image obtained by photographing the bag brought by the customer, in which
- the granting means grants the benefit in response to deciding that the customer brought the bag.

Supplementary Note 11

The information processing system according to supplementary note 10, in which
- the decision means decides whether the registered products can be put in the bag based on a volume of the bag estimated from the image obtained by photographing the bag, and
- the granting means grants the benefit in a case where the registered products can be put in the bag.

Supplementary Note 12

The information processing system according to supplementary note 10 or 11, in which
- the decision means accepts the image obtained by photographing the bag when the number of the registered products exceeds a predetermined number.

Supplementary Note 13

The information processing system according to any one of supplementary notes 1 to 12, in which the determination means determines to grant the benefit only once per one transaction.

Supplementary Note 14

A benefit-granting method including registering a product whose identification information is input by a customer's operation on a portable terminal, accepting necessity of a disposable shopping bag from the portable terminal, determining a benefit in response to registration of one or more products in a case where a fact that a disposable shopping bag is unnecessary is accepted, and granting the determined benefit in a case where payment for the registered product is made.

Supplementary Note 15

A recording medium that non-transiently records a program for causing a computer to execute processes of:

registering a product whose identification information is input by a customer's operation on a portable terminal, accepting necessity of a disposable shopping bag from the portable terminal, determining a benefit in response to registration of one or more products in a case where a fact that a disposable shopping bag is unnecessary is accepted, and granting the determined benefit in a case where payment for the registered product is made.

REFERENCE SIGNS LIST

100 information processing system
101 registration unit
102 accepting unit
103 determination unit
104 granting unit
105 display control unit
1 store system
20 portable terminal
30 registered product list database
31 POS server
32 product database
33 sales database

What is claimed is:

1. An information processing system that communicates with a portable terminal operated at a store by a customer, a registration product list database storing registration product lists for each customer, and a point-of-sale (POS) server managing identification information of products and sales information, the information processing system comprising:

at least one memory configured to store instructions; and at least one processor configured to execute the instructions to:

register a product whose identification information is input by a customer's operation on a portable terminal, and store the registered product in a registration product list for the customer in the registration product list database;

accept necessity of a disposable shopping bag from the portable terminal, by accepting that a disposable shopping bag is unnecessary in a case where a button for refusing the disposable shopping bag on the portable terminal is pressed, and accepting the disposable shopping bag is necessary in a case where a code attached to the disposable shopping bag is scanned with the portable terminal;

store, in association with the registration product list, a transaction state indicating whether the disposable shopping bag is unnecessary or necessary;

change the button for refusing the disposable shopping bag on the portable terminal to be unselectable after accepting that the disposable shopping bag is unnecessary, thereby preventing duplicate input within a single transaction;

determine a benefit in response to registration of one or more products in a case where a fact that a disposable shopping bag is unnecessary is accepted;

display a confirmation screen on the portable terminal in a case where the code attached to the disposable shopping bag is scanned after accepting that the disposable shopping bag is unnecessary, the confirmation screen indicating that granting of the determined benefit will be canceled;

update the transaction state to indicate that the disposable shopping bag is necessary in response to scanning of the code attached to the disposable shopping bag;

determine to cancel granting of the benefit determined in response to confirmation of using the disposable shopping bag on the portable terminal after displaying the confirmation screen;

store information indicating cancellation or granting of the benefit in association with the registration product list;

grant the determined benefit in a case where payment for the registered product is made;

transmit settlement information including the registration product list and the benefit to the POS server, and receive a payment completion notification from the POS server; and update, by the POS server, sales information including the granted benefit.

2. The information processing system according to claim 1, wherein the at least one processor is further configured to execute the instructions to:

cause the portable terminal to display the button for refusing the disposable shopping bag.

3. The information processing system according to claim 2, wherein the at least one processor is further configured to execute the instructions to:

clear the display of the button after the fact that the disposable shopping bag is unnecessary is accepted.

4. The information processing system according to claim 1, wherein the at least one processor is further configured to execute the instructions to:

determine the benefit according to a member rank of the customer.

5. The information processing system according to claim 1, wherein the at least one processor is further configured to execute the instructions to:

determine the benefit according to number of times the customer performed a transaction using the portable terminal.

6. The information processing system according to claim 1, wherein the at least one processor is further configured to execute the instructions to:

determine the benefit according to the number of the registered products.

7. The information processing system according to claim 1, wherein the at least one processor is further configured to execute the instructions to:

determine the benefit according to an amount of money of the registered products.

8. The information processing system according to claim 1, wherein the at least one processor is further configured to execute the instructions to:

determine that the customer has brought a bag based on recognition of the bag from an image obtained by photographing the bag brought by the customer; and grant the benefit in response to determining that the customer brought the bag.

9. The information processing system according to claim 8, wherein the at least one processor is further configured to execute the instructions to:

determine whether the registered products can be put in the bag based on a volume of the bag estimated from the image obtained by photographing the bag; and grant the benefit in a case where it is determined that the registered products can be put in the bag.

10. The information processing system according to claim 8, wherein the at least one processor is further configured to execute the instructions to:

accept the image obtained by photographing the bag in a case where the number of the registered products exceeds a predetermined number.

11. The information processing system according to claim 1, wherein the at least one processor is further configured to execute the instructions to:

determine to grant the benefit only once per one transaction.

12. A benefit-granting method comprising:

registering a product whose identification information is input by a customer's operation on a portable terminal operated at a store by the customer, and store the registered product in a registration product list for the customer in a registration product list database storing registration product lists for each customer;

accepting necessity of a disposable shopping bag from the portable terminal, by accepting that a disposable shopping bag is unnecessary in a case where a button for refusing the disposable shopping bag on the portable terminal is pressed, and accepting the disposable shopping bag is necessary in a case where a code attached to the disposable shopping bag is scanned with the portable terminal;

storing, in association with the registration product list, a transaction state indicating whether the disposable shopping bag is unnecessary or necessary;

changing the button for refusing the disposable shopping bag on the portable terminal to be unselectable after accepting that the disposable shopping bag is unnecessary, thereby preventing duplicate input within a single transaction;

determining a benefit in response to registration of one or more products in a case where a fact that a disposable shopping bag is unnecessary is accepted;

displaying a confirmation screen on the portable terminal in a case where the code attached to the disposable shopping bag is scanned after accepting that the disposable shopping bag is unnecessary, the confirmation screen indicating that granting of the determined benefit will be canceled;

updating the transaction state to indicate that the disposable shopping bag is necessary in response to scanning of the code attached to the disposable shopping bag;

determining to cancel granting of the benefit determined in response to confirmation of using the disposable shopping bag on the portable terminal after displaying the confirmation screen;

storing information indicating cancellation or granting of the benefit in association with the registration product list;

granting the determined benefit in a case where payment for the registered product is made;

transmitting settlement information including the registration product list and the benefit to the POS server, and receive a payment completion notification from the POS server; and updating sales information including the granted benefit by a point-of-sale (POS) server managing identification information of products and sales information.

13. A non-transitory recording medium that records a program for causing a computer to execute processes comprising:

registering a product whose identification information is input by a customer's operation on a portable terminal operated at a store by the customer, and store the registered product in a registration product list for the customer in a registration product list database storing registration product lists for each customer;

accepting necessity of a disposable shopping bag from the portable terminal, by accepting that a disposable shopping bag is unnecessary in a case where a button for refusing the disposable shopping bag on the portable terminal is pressed, and accepting the disposable shopping bag is necessary in a case where a code attached to the disposable shopping bag is scanned with the portable terminal;

storing, in association with the registration product list, a transaction state indicating whether the disposable shopping bag is unnecessary or necessary;

changing the button for refusing the disposable shopping bag on the portable terminal to be unselectable after accepting that the disposable shopping bag is unnecessary, thereby preventing duplicate input within a single transaction;

determining a benefit in response to registration of one or more products in a case where a fact that a disposable shopping bag is unnecessary is accepted;

displaying a confirmation screen on the portable terminal in a case where the code attached to the disposable shopping bag is scanned after accepting that the disposable shopping bag is unnecessary, the confirmation screen indicating that granting of the determined benefit will be canceled;

updating the transaction state to indicate that the disposable shopping bag is necessary in response to scanning of the code attached to the disposable shopping bag;

determining to cancel granting of the benefit determined in response to confirmation of using the disposable shopping bag on the portable terminal after displaying the confirmation screen;

storing information indicating cancellation or granting of the benefit in association with the registration product list;

granting the determined benefit in a case where payment for the registered product is made;

transmitting settlement information including the registration product list and the benefit to the POS server, and receive a payment completion notification from the POS server; and updating sales information including the granted benefit by a point-of-sale (POS) server managing identification information of products and sales information.

14. The information processing system according to claim 8, wherein the at least one processor is further configured to execute the instructions to:

control a camera to photograph the image;

estimate, using the image, a capacity of the bag brought by the customer; and grant the determined benefit in response to determining, using the estimated capacity of the bag brought by the customer, that the registered product can fit into the bag brought by the customer.

* * * * *